US012435687B2

(12) United States Patent
Weber et al.

(10) Patent No.: US 12,435,687 B2
(45) Date of Patent: Oct. 7, 2025

(54) INJECTION DEVICE AND ELECTRIC HEATING DEVICE FOR CORRESPONDING INJECTION DEVICE

(71) Applicant: Eberspächer catem GmbH & Co. KG, Herxheim (DE)

(72) Inventors: Daniela Weber, Winden (DE); Waldemar Fischer, Jockgrim (DE); Ralf Lothar Weinand, Wörth am Rhein (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 0 days.

(21) Appl. No.: 18/372,322

(22) Filed: Sep. 25, 2023

(65) Prior Publication Data

US 2024/0102433 A1  Mar. 28, 2024

(30) Foreign Application Priority Data

Sep. 26, 2022 (DE) ...................... 10 2022 124 676.0

(51) Int. Cl.
*F02M 31/13* (2006.01)
*F24H 3/04* (2022.01)

(52) U.S. Cl.
CPC ........... *F02M 31/13* (2013.01); *F24H 3/0429* (2013.01); *F24H 2250/04* (2013.01)

(58) Field of Classification Search
CPC ................. F02M 31/13; F02M 31/042; F02M 35/10249; F02M 35/10268;
(Continued)

(56) References Cited

U.S. PATENT DOCUMENTS 6,040,557 A  3/2000 Prust et al.
8,362,406 B2 * 1/2013 Bohlender ............ F24H 9/1872
219/202
(Continued)

FOREIGN PATENT DOCUMENTS

CN  102392765 A  3/2012
DE  69633087 T2  8/2005
(Continued)

OTHER PUBLICATIONS

Amazon.com "RAParts 3009-1020—Lower Radiator Hose Heater" (Year: 2021).*

*Primary Examiner* — Kurt Philip Liethen
(74) *Attorney, Agent, or Firm* — Boyle Fredrickson, S.C.

(57) ABSTRACT

A fuel injection nozzle is connected to a pump for injecting the fuel and to a fresh air supply for the internal combustion engine. In order to provide an injection device which allows temperature control of the injected media with a simple structure and arrangement in the motor vehicle, the injection device has an electric heating device for heating the fresh air supplied. The heating device is fluidically connected via a first hose section to the inlet side of the fresh air supply and via a second hose section to the internal combustion engine. The heating device has a layered heating block comprising at least one heat-emitting layer and at least one heat-generating layer coupled thereto in a heat-conducting manner. The heat-generating layer includes at least one PTC element and conductor elements abutting opposed sides of the PTC element.

9 Claims, 3 Drawing Sheets

(58) Field of Classification Search
CPC ............ F02M 35/10321; F24H 3/0429; F24H 2250/04; H05B 2203/016; H05B 2203/02; H05B 2203/022; H05B 3/06
See application file for complete search history.

(56) References Cited

U.S. PATENT DOCUMENTS

| | | | | |
|---|---|---|---|---|
| 2001/0027776 | A1* | 10/2001 | Amou | F02M 69/044 |
| | | | | 123/590 |
| 2008/0099464 | A1* | 5/2008 | Niederer | F24H 3/0429 |
| | | | | 219/520 |
| 2009/0026191 | A1* | 1/2009 | Bohlender | F24H 3/0405 |
| | | | | 219/520 |
| 2009/0260600 | A1* | 10/2009 | Kim | F02M 37/14 |
| | | | | 123/549 |
| 2011/0146233 | A1* | 6/2011 | Carlill | F02D 41/3836 |
| | | | | 60/285 |
| 2012/0152931 | A1* | 6/2012 | Bohlender | F24H 3/0429 |
| | | | | 219/520 |
| 2012/0291760 | A1* | 11/2012 | Vigild | F02M 31/13 |
| | | | | 123/549 |
| 2016/0153407 | A1 | 6/2016 | Ursic et al. | |
| 2016/0360572 | A1* | 12/2016 | Bohlender | H05B 3/50 |

FOREIGN PATENT DOCUMENTS

| | | |
|---|---|---|
| DE | 10 2018 204 441 A1 | 9/2019 |
| EP | 0579541 | 1/1994 |
| EP | 3564613 | 11/2019 |
| GB | 2319561 | 5/1998 |
| JP | H09 177621 A | 7/1997 |

\* cited by examiner

INJECTION DEVICE AND ELECTRIC HEATING DEVICE FOR CORRESPONDING INJECTION DEVICE

BACKGROUND OF THE INVENTION

1. Field of the Invention

The present invention relates to the field of conditioning fuel in an internal combustion engine. In particular, the present invention relates to an engine with direct injection of the fuel burned in the engine.

2. Background of Related Art

Injection devices for direct injection into an internal combustion engine have an injection nozzle which injects the fuel directly into the combustion chamber or into a supplied fresh air flow in the flow direction immediately upstream of the engine. The fresh air is supplied via a hose in which an air mass meter and a throttle device can be installed, which are connected in terms of control to a control device to the injection device, which control device can also control a pump for injecting the fuel and, if necessary, further units or process signals from further sensors. For example, a pressure sensor can be provided in the area of the engine, via which the operating pressure of the injected fuel is determined shortly before the outlet of the corresponding injection nozzle.

These generally known features are also considered to be at least preferred features of the injection device according to the invention.

Depending on the ambient conditions, there is a desire to heat the fluids supplied to the combustion chamber, i.e. the fuel and/or the air. From DE 10 2018 204 441 A1, a fuel heating device is known as part of an injection device. In this prior art, the fuel is heated via a PTC heating assembly arranged between the central fuel supply and the individual injection nozzles, wherein a corresponding fuel heating assembly is assigned to each individual injection nozzle.

SUMMARY

The underlying problem of the present invention is to provide an injection device which allows temperature control of the injected media with a simple structure and arrangement in the motor vehicle.

In order to solve this problem, an injection device according to the invention has an electric heating device for heating the supplied fresh air, which is arranged inside the fresh air supply and which is provided on both sides between hose sections of the fresh air supply. For this purpose, the electric heating device is located between a first hose section, which is provided on the inlet side and communicates with an inlet opening for the supply of fresh air. The electric heating device is provided between this first hose section and a second hose section, which is fluidically connected to the engine. This allows the electric heating device to be provided spaced apart easily and protected from vibration and, above all, from waste heat from the motor. For generating heat, the electric heating device has a layered heating block comprising at least one heat-generating layer with at least one PTC element and conductor elements abutting it on opposed sides of the PTC element. The layered structure also has at least one heat-emitting layer.

The heat-emitting layer may be a corrugated fin layer formed by meandering bending of a strip of sheet metal with good heat-conducting properties, for example, of aluminum or copper. The heat-generating layer is usually provided between two heat-emitting layers. Such a heating cell with two heat-emitting layers and a heat-generating layer provided therebetween usually constitutes the smallest unit of the electric heating device. The electric heating device may also be limited to such a heating block.

The heating block is usually located in a housing of the electric heating device. The heating block may be held pre-tensioned therein by means of a spring, so that the different layers of the layered heating block are applied against each other under pretension, which improves heat extraction and also ensures good electrical conduction between the conductor elements and the at least one PTC element. A good electrical connection of the PTC element is required, not least because the electric heating device according to the present invention is usually operated with the vehicle electrical system voltage of twelve volts, which can lead to correspondingly high currents with the given power consumption of the electric heating device of several hundred watts.

In view of a simple manufacturing of the electric heating device, it is proposed according to a preferred further development of the present invention to provide a two-part housing, wherein each of the housing parts forms a hose connection piece for the respective hose pieces and a frame-shaped housing segment in a structural unit, which at least partially surrounds the heating block. This housing can be provided to encompass the heating block in the direction of flow of the fresh air to be heated and/or in in the circumferential direction around the heating block. The circumferential direction is usually perpendicular to the flow direction of the fresh air flow to be heated. The hose connection pieces are usually provided flush with each other. The heating block extends transversely to the direction of passage of the fresh air predetermined by the connection pieces. In other words, the individual layers of the layered heating block are layered in a plane that extends transversely to the longitudinal axis of the hose connection pieces.

The housing parts may be formed from plastic and can accordingly be manufactured inexpensively as mass-produced components. The housing parts may be interlocked with one another with the heating block enclosed.

To accommodate the layered heating block, the housing parts may form frame segments. Each frame segment surrounds the heating block circumferentially and also forms contact surfaces supporting the heating block in the direction of passage of the fresh air. The contact surfaces of the individual housing parts are thereby usually positioned relative to one another such that the heating block is held firmly and without play between the two housing parts, preferably clamped. The spring mentioned above, which tensions the individual layers of the layered structure against each other, can also help here to ensure that the heating block is held vibration-resistant in the housing, so that no vibration noise can be emitted by the electric heating device, which is sometimes perceived as irritating in a vehicle.

For supporting the layered heating block between the two housing parts, it is proposed to provide at least one support web between the aforementioned frame segment and the respective hose connection piece of the individual housing part for supporting the heating block in the direction of passage of the fresh air. In view of a possibly unhindered passage of the fresh air to be heated through the layered heating block, the support webs associated with one housing part should be flush with a corresponding support web of the other housing part in the longitudinal direction of the hose connection pieces. Thee heat-generating layer may be provided between opposing support webs extending parallel to the heat-generating layer. This is because the heat-generating layer as such contributes only insignificantly to the heating of the fresh air. Heating takes place in particular via the individual fins of the heat-emitting layers.

According to a possible further configuration, which enables a compact electrical connection of the electric heating device to the power current and, if necessary, a control system to the power current, conductor elements assigned to different polarities are formed by contact sheets which are extended laterally beyond the heating block and which have contact tongues integrally formed thereon. These contact tongues are preferably provided in a connector housing formed by only one of the housing parts. The joining of the two housing parts, including the heating block, therefore inevitably also leads to the accommodation of the contact tongues in the connector housing. The conductor elements of different polarity mentioned here, which form the contact tongues, do not necessarily have to be those conductor elements which are directly applied against the at least one PTC element and energize it. Rather, the conductor elements assigned to different polarity are located on opposite sides of the PTC element within the layered heating block, wherein these can also accommodate at least one heat-generating layer between them on one or both sides of the PTC element. This is because this heat-generating layer is usually electrically conductive and formed from a metal.

For a particularly compact electrical connection, it is proposed according to a possible further development of the present invention that the contact tongues and the connector housing provide a plug contact extending essentially parallel to the connection pieces. A mating connector to be plugged into the connector housing is accordingly introduced to the connector housing parallel to one of the connection pieces and connected to the connector housing with simultaneous electrical plug contacting with the connector housing. The connector housing preferably has an extension in the longitudinal direction of the connection piece which is smaller than the corresponding extension of the connection piece. The front section of the hose connection piece protruding beyond the connector housing can thus be connected to a hose carrying the fresh air without being hindered by the connector housing.

Also disclosed are a heating device having at least some of the characteristics described above and an internal combustion engine in combination with a fuel injector and a heating device having at least some of the characteristics described above.

BRIEF DESCRIPTION OF THE DRAWINGS

Further details and advantages of the present invention will be apparent from the following description of an embodiment in conjunction with the drawing. Therein.

DETAILED DESCRIPTION

Figure 1:
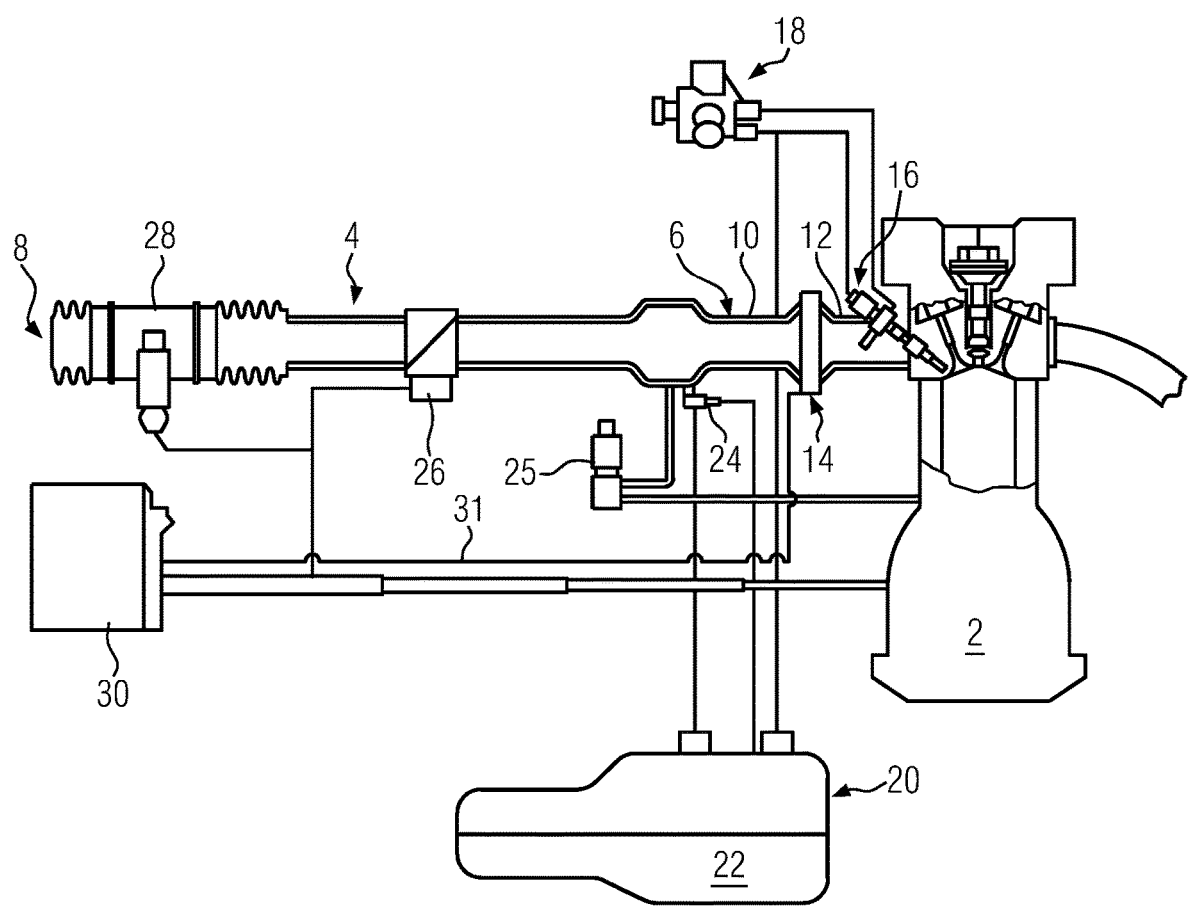
FIG. 1 shows a schematic view of essential components of an injection device according to the present invention.

FIG. 1 shows a schematic view of essential components of an injection device with an internal combustion engine 2, to which the air inlet side is shown on the left of the internal combustion engine 2 and the exhaust gas side on the right, which will not be discussed in detail.

A fresh air supply system characterized by reference sign 4 comprises a hose 6 which is divided into two at least adjacent to the internal combustion engine 2 and has a first hose section 10 associated with an inlet side 8 and a second hose section 12 connected to the engine. An electric heating device 14 is located between these two hose sections 10, 12.

Downstream of the electric heating device 14, an injection nozzle is characterized by reference sign 16, which is connected in terms of flow to a pressure side of a pump 18, wherein the pump 18 communicates on the inlet side with a tank 20 for fuel 22.

Upstream of the electric heating device 14, an intake manifold pressure sensor 24 is located in the fresh air supply 4, as well as an outlet to an exhaust gas recirculation valve 25 provided adjacent thereto and a throttle device 26 for throttling the fresh air introduced. Downstream of the throttle device 26, a mass air flow sensor with temperature sensor 28 is provided. Reference sign 30 characterizes an electronic control unit which is connected to the various components of the injection device in terms of data and controls them or receives their signals and processes them for control purposes. In this electronic control unit 30, a control system for the electric heating device 14 may also be provided. This arrangement is illustrated by a cable 31 which supplies a 12-volt power current to the electric heating device 14 under control of the electronic control unit 30.

Details of the electric heating device 14 can be seen in FIGS. 2 to 5.

Figure 2:
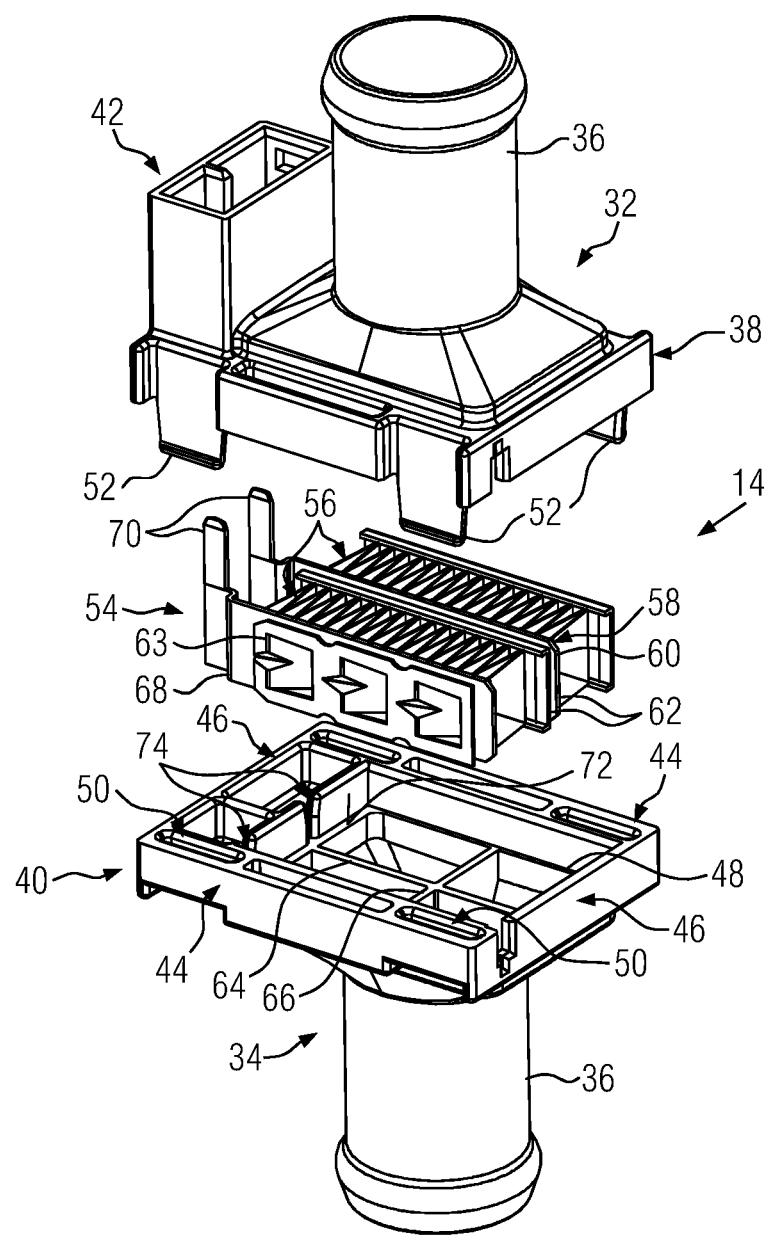
FIG. 2 shows a perspective exploded view of the electric heating device of the injection device according to FIG. 1.

As illustrated in particular by FIG. 2, the electric heating device 14 has two housing parts, a first housing part of which is characterized by reference sign 32 and a second housing part by reference sign 34. Both housing parts 32, 34 have respective hose connection pieces 36 and frame segments. The frame segment of the first housing part 32 is characterized by reference sign 38; the frame segment of the other housing part 34 by reference sign 40. The first housing part 32 further has a connector housing characterized by reference sign 42. The various functional areas of the respective housing parts 32 and 34 are each uniformly realized. The housing parts 32, 34 are each injection molded parts made of plastic.

The frame segments 38, 40 each have longitudinal beams 44 and cross beams 46, each of which delimits a rectangular accommodation space 48. The longitudinal beams 44 are each provided with double walls with a slot in between, which is interrupted by webs. This not only mechanically stiffens the longitudinal beams 44. Rather, latching receptacles 50 are formed by the second housing part 34 in any case, into which latching tongues of the first housing part 32, characterized by reference sign 52, can lock in order to connect the two housing parts 32, 34 to one another in a form-fitting manner.

Figure 3:
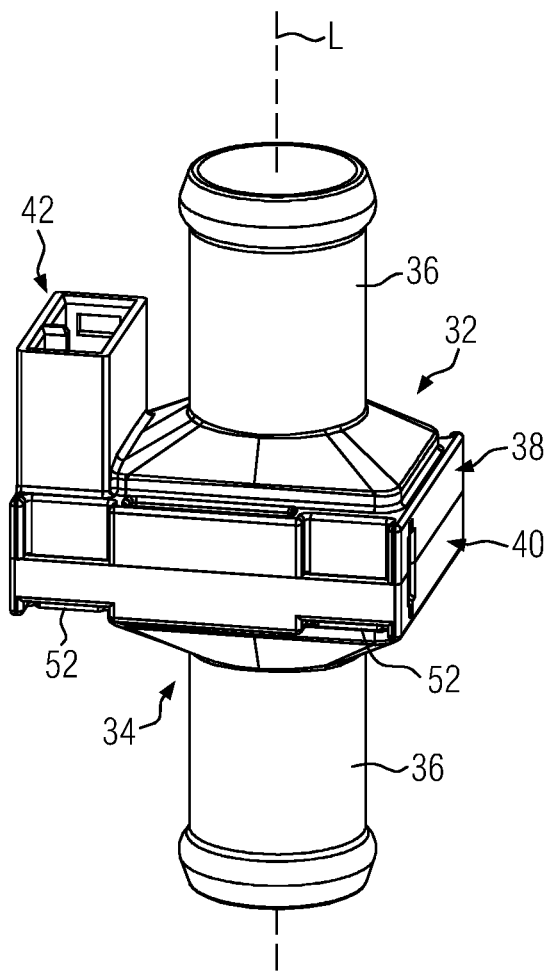
FIG. 3 shows a perspective side view of the electric heating device according to FIG. 2.
Figure 4:
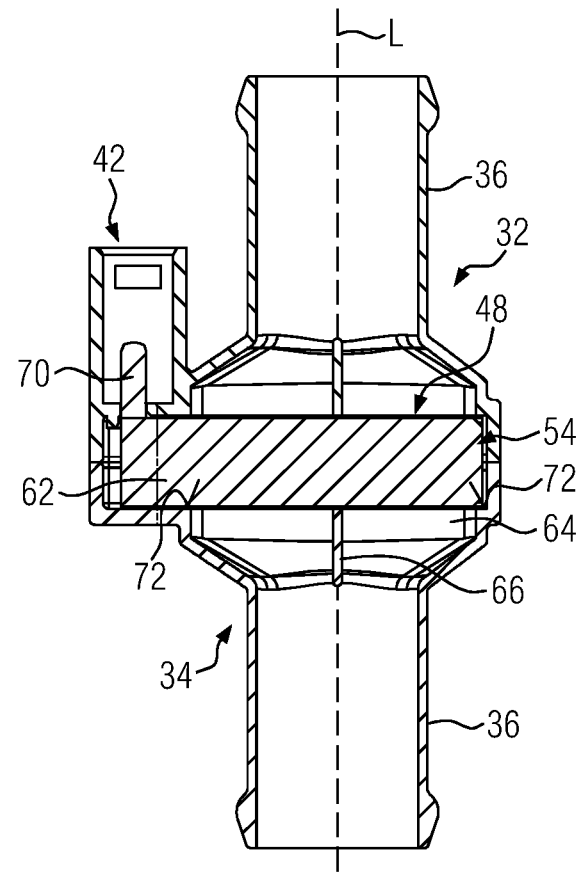
FIG. 4 shows a longitudinal sectional view of the electric heating device according to FIGS. 2 and 3.
Figure 5:
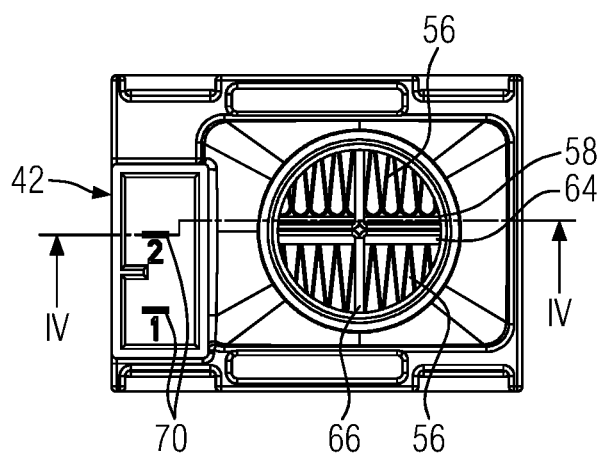
FIG. 5 shows a top view of the electric heating device according to FIGS. 2 to 4.

As particularly illustrated in FIGS. 3 and 4, the hose connection pieces 36 are flush when the housing parts 32, 34 are joined and provide a common longitudinal axis L that passes centrally through each of the hose connection pieces 36.

In FIG. 2, a heating block characterized by reference sign 54 is shown between the two housing parts 32, 34, which in this case comprises two heat-emitting layers 56 and a heat-generating layer 58 provided therebetween. This heat-generating layer 58 has a PTC element 60 and conductor elements 62 contacting this PTC element 60 on both sides, presently in the form of contact sheets formed by punching and bending. Reference sign 63 characterizes a spring which extends over the entire length of the heat-emitting layer 56 or the heat-generating layer 58. This spring 63 is supported internally against the longitudinal beams 44 and is mounted in the accommodation space 48, as is the entire heating block 54. As FIG. 4 in particular illustrates, the accommodation for the heating block 54 is created in each case in halves by the accommodation spaces 48. Each of the accommodation spaces 48 is bounded between the heating block 54 and the hose connection piece 36 of the respective housing part 32/34 by support webs 64, 66 extending perpendicularly. The support web characterized by reference sign 64 extends parallel to the heat-generating layer 58. This heat-generating layer 58 is received between the support webs 64 of the two housing parts 32, 34. The other support web 66 extends perpendicularly to the previously discussed support web 64 and penetrates centrally through the accommodation for the heating block 54, so that the two support webs 64, 66 intersect at the level of the longitudinal axis L; cf. FIG. 5.

The heating block 54 includes a plurality of contact sheets. In addition to the two conductor elements 62 mentioned above, which abut directly against the PTC element 60, the heating block 54 as a whole is bounded by further sheets, of which the front sheet characterized in FIG. 2 forms a conductor element 68 which, like the conductor element 62 provided for this purpose on the other side of the PTC element 60, forms a contact tongue 70. The two contact tongues 70 extend parallel to the longitudinal axis L and are surrounded by the connector housing 42. Thus, a plug contacting parallel to the longitudinal axis L for contacting the cable 31 with the electric heating device 14 is predetermined by the contact tongues 70 and the connector housing 42 open on one side.

It is evident that the connector housing 42 is shorter than the hose connection piece 36 of the first housing part 32. The two hose connection pieces 36 have a bead at the end over which the respective hose pieces 10, 12 are pulled. The corresponding bead prevents the hose piece 10, 12 or a hose clamp from slipping off the respective hose connection piece 36.

FIGS. 2 and 4 illustrate further contact surfaces for the heating block 54, characterized by reference sign 72. These contact surfaces are formed by the cross beams 46 and support the heating block 54 at its opposite ends. The cross beam 46 of the two housing parts 32, 34, which is provided adjacent to the connector housing 42, has longitudinal slots 74 which accommodate the two conductor elements 62, 68 forming contact tongues 70 therein and transfer them into the connector housing 42. The corresponding connector housing is closed on the underside.

The invention claimed is:

1. An injection device for an internal combustion engine, comprising:
   an injection nozzle that is configured to inject fuel, the injection device being configured for connection to a fuel pump and to a fresh air supply for the internal combustion engine; and
   an electric heating device for heating the supplied fresh air, wherein the electric heating device is configured to be fluidically connected to an inlet side of the fresh air supply via a first hose section and to the internal combustion engine via a second hose section, and wherein the electric heating device has a layered heating block comprising at least one heat-emitting layer and at least one heat-generating layer coupled thereto in a heat-conducting manner, wherein the heat-generating layer comprises at least one PTC element and conductor elements abutting opposed sides of the PTC element; and
   wherein the electric heating device comprises a two-part housing having a first housing part and a second housing part;
   wherein the first housing part includes a first hose connection piece for the first hose section and a first frame segment, which at least partially surrounds the heating block;
   wherein the second housing part includes a second hose connection piece for the second hose section and a second frame segment, which at least partially surrounds the heating block; and
   wherein first and second support webs are provided between one of the frame segments and an associated one of the first and second hose connection pieces and support the heating block in a direction of passage of the air, the first and second support webs intersecting at a location that is longitudinally aligned with the first and second hose connection pieces.

2. The injection device according to claim 1, wherein the housing parts are formed of plastic and are interlocked with each other with the heating block enclosed.

3. The injection device according to claim 1, wherein the frame segments circumferentially surround the heating block.

4. The injection device according to claim 3, wherein the heat-generating layer is provided between opposing support webs extending parallel to the heat-generating layer.

5. The injection device according to claim 1, wherein conductor elements assigned to different polarity are formed by contact sheets which extend laterally beyond the heating block and which have contact tongues formed integrally thereon.

6. The injection device according to claim 5, wherein the contact tongues are provided in a connector housing formed by one of the housing parts.

7. The injection device according to claim 6, wherein the contact tongues and the connector housing provide a plug contact extending substantially parallel to the hose connection pieces.

8. An electric heating device, for heating fresh air supplied to an internal engine fueled by an injection device, comprising:
   a layered heating block; and
   a two-part housing having a first housing part and a second housing part, the first housing part including a first hose connection piece and a first frame segment, which at least partially surrounds the heating block, and the second housing part includes a second hose connection piece and a second frame segment, which at least partially surrounds the heating block; and
   at least one of the first and second housing parts including first and second support webs provided between the heating block and the respective hose connection piece to support the heating block in a direction of passage of the air;
   wherein the first and second support webs intersect at a location longitudinally aligned with the first and second hose connection pieces; and
   wherein the layered heating block has at least one heat-emitting layer and at least one heat-generating layer coupled thereto in a heat-conducting manner, and wherein the heat-generating layer has at least one PTC element and conductor elements abutting on opposed sides of the PTC element.

9. In combination: an internal combustion engine; a fuel pump; a fresh air supply; an injection nozzle that is connected to the fuel pump and that is configured to inject fuel into the fresh air supply; and an electric heating device for heating the supplied fresh air, wherein the electric heating device is be fluidically connected to an inlet side of the fresh air supply via a first hose section and to the internal combustion engine via a second hose section, and wherein the electric heating device has a layered heating block comprising at least one heat-emitting layer and at least one heat-generating layer coupled thereto in a heat-conducting manner, wherein the heat generating layer comprises at least one PTC element and conductor elements abutting opposed sides of the PTC element; and wherein the electric heating device comprises a two-part housing having a first housing part and a second housing part, wherein each of the first and second housing parts forms, as a structural unit, a hose connection piece for a respective hose section and a frame segment, which at least partially surrounds the heating block; at least one of the first and second housing parts including first and second support webs provided between the heating block and the respective hose connection piece to support the heating block in a direction of passage of the air; wherein the first and second support webs intersect at a location longitudinally aligned with the first and second hose connection pieces; and wherein the conductor elements assigned to different polarity are formed by contact sheets which extend laterally beyond the heating block to provide contact tongues formed integrally thereon and extending perpendicular from the contact sheets; wherein the contact tongues are provided in a connector housing formed by one of the housing parts; and wherein the contact tongues and the connector housing provide a plug contact extending substantially parallel to the hose connection pieces.

* * * * *